United States Patent
Manabe et al.

(10) Patent No.: US 9,727,066 B2
(45) Date of Patent: Aug. 8, 2017

(54) FUEL CELL SYSTEM

(75) Inventors: Kota Manabe, Toyota (JP); Hikaru Arai, Nagoya (JP); Tomohiko Kaneko, Okazaki (JP); Hiroyuki Imanishi, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 584 days.

(21) Appl. No.: 14/130,805

(22) PCT Filed: Jul. 5, 2011

(86) PCT No.: PCT/JP2011/065328
§ 371 (c)(1),
(2), (4) Date: Jan. 3, 2014

(87) PCT Pub. No.: WO2013/005295
PCT Pub. Date: Jan. 10, 2013

(65) Prior Publication Data
US 2014/0152089 A1    Jun. 5, 2014

(51) Int. Cl.
*G05F 1/46* (2006.01)
*H02M 3/158* (2006.01)
(Continued)

(52) U.S. Cl.
CPC ........... *G05F 1/46* (2013.01); *B60L 1/003* (2013.01); *B60L 7/14* (2013.01); *B60L 11/1803* (2013.01); *B60L 11/1887* (2013.01); *H02M 3/00* (2013.01); *H02M 3/1584* (2013.01); *B60L 2210/46* (2013.01); *B60L 2240/525* (2013.01); *B60L 2260/44* (2013.01); *B60L 2270/142* (2013.01); *B60L 2270/145* (2013.01);
(Continued)

(58) Field of Classification Search
USPC ................................................. 307/151, 9.1
See application file for complete search history.

(56) References Cited

U.S. PATENT DOCUMENTS

| | | | |
|---|---|---|---|
| 9,106,125 B1* | 8/2015 | Brandt | H02M 7/068 |
| 2009/0102446 A1 | 4/2009 | Takahashi et al. | |
| 2009/0160248 A1* | 6/2009 | Ang | B60K 6/445 |
| | | | 307/9.1 |
| 2010/0225286 A1* | 9/2010 | Osaka | H02M 3/1584 |
| | | | 323/272 |

(Continued)

FOREIGN PATENT DOCUMENTS

| | | | |
|---|---|---|---|
| CN | 101399493 A | | 4/2009 |
| JP | 63-069465 | * | 3/1988 |

(Continued)

*Primary Examiner* — Rexford Barnie
*Assistant Examiner* — Xuan Ly
(74) *Attorney, Agent, or Firm* — Andrews Kurth Kenyon LLP

(57) ABSTRACT

In a fuel cell system which includes a high-electricity multiple-phase converter, noise generated due to an increase in reactor vibrations and due to a sound pressure increase caused by a plurality of reactors is effectively inhibited, and silence is improved. A fuel cell system includes a multiple-phase converter provided between a fuel cell and a load device. The fuel cell system includes: selecting means (e.g., a controller) for selecting a driving phase of the multiple-phase converter in accordance with the load of the load device; and driving means (e.g., a controller) for driving a plurality of driving phases, when selected by the selecting means, at carrier frequencies so that these driving phases are nearly opposite to each other.

11 Claims, 6 Drawing Sheets

(51) Int. Cl.
*B60L 1/00* (2006.01)
*B60L 7/14* (2006.01)
*B60L 11/18* (2006.01)
*H02M 3/00* (2006.01)
*H02M 1/00* (2006.01)

(52) U.S. Cl.
CPC ............... *H02M 2001/0048* (2013.01); *H02M 2003/1586* (2013.01); *Y02T 10/7241* (2013.01); *Y02T 10/92* (2013.01); *Y02T 90/34* (2013.01)

(56) References Cited

U.S. PATENT DOCUMENTS

2012/0091977 A1* 4/2012 Carroll ............... H02M 3/1584
                                                        323/271

FOREIGN PATENT DOCUMENTS

| JP | 63-069465 A | | 3/1988 |
|----|----|----|----|
| JP | 2000-228882 | * | 8/2000 |
| JP | 2000-228882 A | | 8/2000 |
| JP | 2002-064979 A | | 2/2002 |
| JP | 2005-312279 A | | 11/2005 |
| JP | 2006-333572 A | | 12/2006 |
| JP | 2007-060764 | * | 3/2007 |
| JP | 2007-060764 A | | 3/2007 |
| JP | 2008-042983 A | | 2/2008 |
| JP | 2009-100607 A | | 5/2009 |
| JP | 2009-131024 A | | 6/2009 |
| JP | 2009-171729 A | | 7/2009 |
| JP | 2010-207063 A | | 9/2010 |

* cited by examiner

FUEL CELL SYSTEM

CROSS-REFERENCE TO RELATED APPLICATIONS

This is a national phase application based on the PCT International Patent Application No. PCT/JP2011/065328 filed on Jul. 5, 2011, the entire contents of which are incorporated herein by reference.

TECHNICAL FIELD

The present invention relates to a fuel cell system.

BACKGROUND ART

There has heretofore been suggested a fuel cell vehicle equipped with a fuel cell which is supplied with reactant gases (a fuel gas and an oxidation gas) and thereby generates electricity, together with a secondary cell such as a storage cell. An electric vehicle such as the fuel cell vehicle is generally equipped with an inverter provided between the fuel cell and an electric motor, and a controller which controls the inverter by pulse width modulation (PWM).

At present, there has been suggested a technique for measuring the speed of the fuel cell vehicle and the temperature of a switching element of the inverter, and increasing the carrier frequency of the inverter to a value higher than a normal value when measured values of both the speed and the temperature are equal to or less than predetermined thresholds (e.g. refer to Patent Document 1). It is known that the use of such a technique permits the reduction of both the overheating of the switching element and switching noise.

CITATION LIST

Patent Document

Patent Document 1: Japanese Patent Application Laid-Open No. 2005-312279

SUMMARY OF THE INVENTION

Problem to be Solved by the Invention

Meanwhile, a high-electricity multiple-phase converter has been recently developed to convert a direct-current voltage supplied from a storage cell to a higher direct-current voltage. The problem of this multiple-phase converter is that new noise is generated due to an increase in reactor vibrations and due to a sound pressure increase caused by a plurality of reactors because a current running through the reactor is also higher.

It has been proved that the new noise generated by the use of such a multiple-phase converter cannot be sufficiently inhibited by frequency switching control described in Patent Document 1 alone.

The present invention has been made in view of the circumstances. An object of the invention is to effectively inhibit noise generated due to an increase in reactor vibrations and due to a sound pressure increase caused by a plurality of reactors and to improve silence in a fuel cell system which includes a high-electricity multiple-phase converter.

Means for Solving the Problem

To achieve the above-mentioned object, there is provided a fuel cell system according to the present invention which includes a multiple-phase converter provided between a fuel cell and a load device. The fuel cell system includes selecting means for selecting a driving phase of the multiple-phase converter in accordance with the load of the load device, and driving means for driving a plurality of driving phases, when selected by the selecting means, at carrier frequencies so that these driving phases are nearly opposite to each other.

As the driving means, it is possible to use, for example, driving means for driving four driving phases with a phase difference of 90° when the selecting means selects the four driving phases, driving means for driving two driving phases with a phase difference of 180° when the selecting means selects the two driving phases, and driving means for driving three driving phases with a phase difference of 90° when the selecting means selects the three driving phases.

If this configuration is used, a plurality of driving phases of the multiple-phase converter, when selected, can be driven so that these driving phases are opposite to each other. Therefore, an output current can be interleaved (ripple currents counteract each other), so that noise of a reactor can be reduced.

In the fuel cell system according to the present invention, driving means for switching the carrier frequencies of the driving phases within a predetermined band can be used. As such driving means, it is possible to use driving means for randomly selecting a plurality of carrier frequencies within a predetermined band around a reference carrier frequency of the driving phases, and switching to the selected carrier frequencies. It is particularly preferable to use driving means that uses a normal distribution as the distribution of the selected carrier frequencies.

If this configuration is used, the carrier frequencies of the driving phases can be switched within the predetermined band when the driving phases of the multiple-phase converter are driven. Therefore, the sound pressure of the reactor of each phase can be reduced, and noise can be further reduced.

In the fuel cell system according to the present invention, it is possible to provide gain correction means for correcting a feedback gain in response to the switching of the carrier frequencies by the driving means when the multiple-phase converter is feedback-controlled synchronously with the carrier frequency. For example, when PI feedback control having a proportional gain and an integral gain is used, it is possible to use gain correction means for correcting the integral gain in accordance with the reference carrier frequency and the carrier frequency after switched.

In the fuel cell system according to the present invention, it is possible to provide sin wave superposing correcting means for correcting sampled current and voltage values by superposing a sin wave signal corresponding to the carrier frequency after switched by the driving means when sampling is performed by superposing the sin wave signal on an input current and an input voltage to measure the impedance of an input electric supply to the multiple-phase converter.

In the fuel cell system according to the present invention, it is possible to provide current sampling correcting means for correcting the timing of sampling in response to the switching of the carrier frequencies by the driving means when a reactor current of the multiple-phase converter is sampled.

In the fuel cell system according to the present invention, it is possible to provide temperature correcting means for correcting an element temperature estimated in response to the switching of the carrier frequencies by the driving means when the carrier frequency is used to estimate the element temperature of the multiple-phase converter.

Effect of the Invention

According to the present invention, in the fuel cell system which includes the high-electricity multiple-phase converter, it is possible to effectively inhibit noise generated due to an increase in reactor vibrations and due to a sound pressure increase caused by a plurality of reactors, and improve silence.

MODE FOR CARRYING OUT THE INVENTION

Hereinafter, a fuel cell system 1 according to an embodiment of the present invention will be described with reference to the drawings. The fuel cell system 1 according to the present embodiment is an electricity generation system installed in a fuel cell vehicle.

Figure 1:
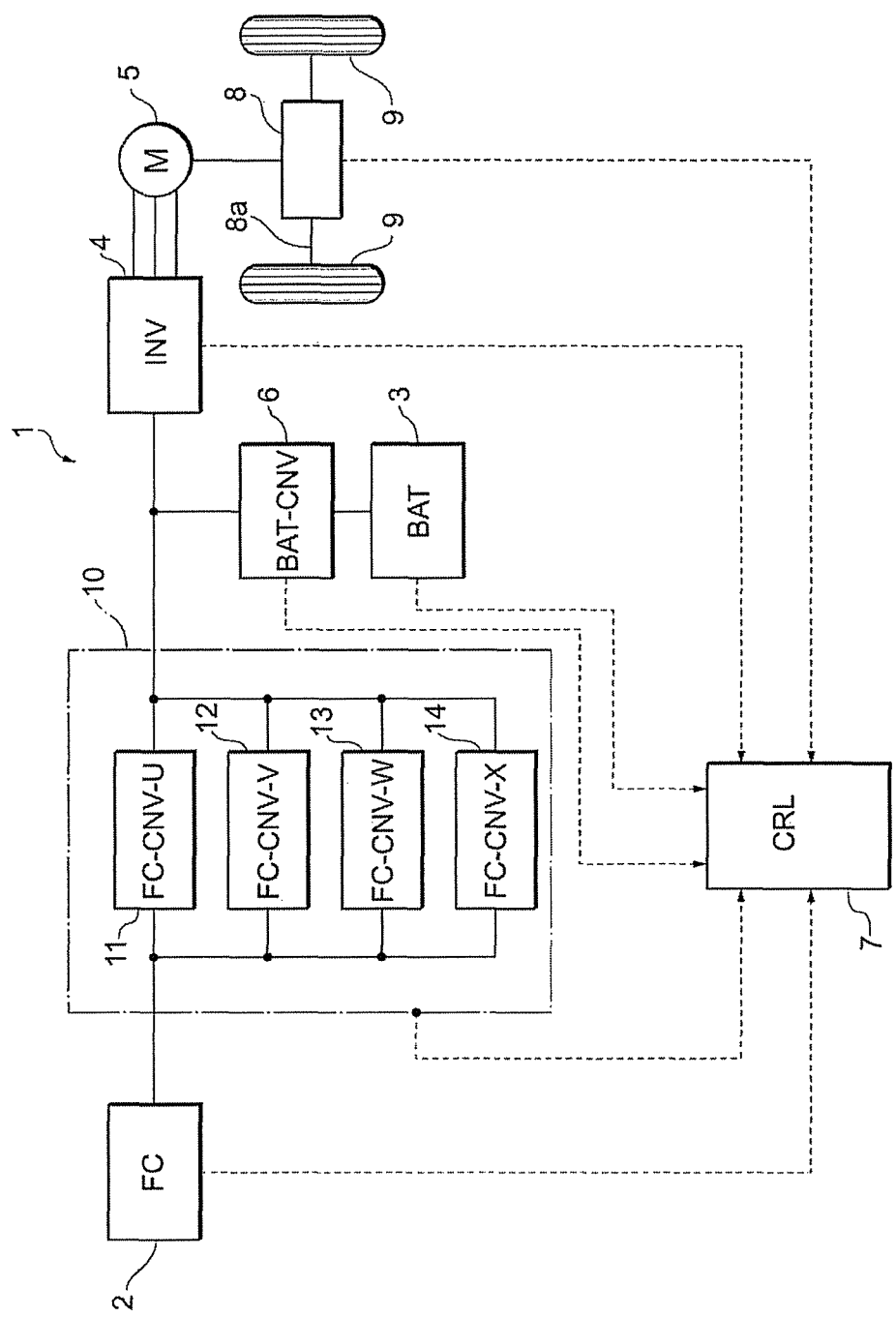
FIG. 1 is a configuration diagram of a fuel cell system according to an embodiment of the present invention.

As shown in FIG. 1, the fuel cell system 1 supplies electricity generated by a fuel cell 2 and a battery 3 to a traction motor 5 through an inverter 4, and thereby rotationally drives the traction motor 5. The fuel cell system 1 includes an FC converter 10 provided between the fuel cell 2 and the inverter 4, a battery converter 6 provided between the battery 3 and the inverter 4, and a controller 7 which performs integrated control of the whole system.

The fuel cell 2 is a solid polymer electrolytic cell stack configured to have a plurality of electric cells stacked in series. In the fuel cell 2, an oxidative reaction in Equation (1) below is caused in an anode electrode, a reduction reaction in Equation (2) below is caused in a cathode electrode, and an electromotive reaction in Equation (3) below is caused in the whole fuel cell 2.

$$H_2 \rightarrow 2H^+ + 2e^- \quad (1)$$

$$(½)O_2 + 2H^+ + 2e^- \rightarrow H_2O \quad (2)$$

$$H_2 + (½)O_2 \rightarrow H_2O \quad (3)$$

The electric cells constituting the fuel cell 2 has a structure in which a membrane-electrode assembly (MEA) configured to have a polymer electrolytic membrane held between the anode electrode and the cathode electrode is held between separators for supplying a fuel gas and an oxidation gas. The fuel cell 2 is provided with: a system which supplies the fuel gas to the anode electrode; a system which supplies the oxidation gas to the cathode electrode; and a system which supplies a cooling fluid into the separators. The supply volume of the fuel gas and the supply volume of the oxidation gas are controlled in accordance with a control signal from the controller 7 so that desired electricity can be generated.

The FC converter 10 functions to control an output voltage of the fuel cell 2. As shown in FIG. 1, the FC converter 10 according to the present embodiment is a multiple-phase converter in which four phases of a U-phase converter 11, a V-phase converter 12, a W-phase converter 13, and an X-phase converter 14 are connected in parallel. In accordance with a load (required electricity) of a load device such as the traction motor 5, the FC converter 10 can switch a driving phase to, for example, one-phase driving that only uses one phase (e.g. U-phase), two-phase driving that uses two phases (e.g. U-phase and V-phase), three-phase driving that uses three phases (e.g. U-phase, V-phase, and W-phase), and four-phase driving that uses all the driving phases.

The FC converter 10 controls the output voltage of the fuel cell 2 so that this voltage will be a voltage corresponding to a target output. The output voltage and output current of the FC converter 10 can be detected by a voltage sensor and a current sensor that are not shown. In the present embodiment, a reactor current sensor which detects a current (reactor current) running through a reactor in each driving phase is provided.

The types of switching elements used in the phases (U-phase, V-phase, W-phase, and X-phase) of the FC converter 10 include: for example, diodes such as a junction Schottky diode, a p-i-n/Schottky composite diode, and a MOS barrier Schottky diode; current-controlled transistors such as a bipolar junction transistor (BJT) and a Darlington; thyristors such as a normal thyristor and a gate-turn-off (GTO) thyristor; and voltage-controlled transistors such as a MOS field effect transistor (FET), an insulated gate bipolar transistor (IGBT), and an injection enhanced insulated gate transistor (IEGT). Among these types, the thyristors and the voltage-controlled transistors are preferable.

The battery 3 is connected to the traction motor 5 in parallel to the fuel cell 2. The battery 3 functions to store surplus electricity and regenerative energy during regenerative braking, and also functions as an energy buffer during a load variation caused by acceleration or deceleration of the fuel cell vehicle. As the battery 3, it is possible to use, for example, a secondary cell such as a nickel-cadmium storage cell, a nickel-hydrogen storage cell, or a lithium secondary cell.

The battery converter 6 functions to control an input voltage of the inverter 4. For example, it is possible to use a battery converter having a circuit configuration similar to that of the FC converter 10. A step-up converter may be used as the battery converter 6, but a step-up/step-down converter capable of step-up operation and step-down operation may be used instead. Various configurations capable of controlling the input voltage of the inverter 4 can be used.

As the inverter 4, it is possible to use, for example, a PWM inverter driven by a pulse width modulation method. The inverter 4 converts a direct-current voltage supplied from the fuel cell 2 and the battery 3 to three-phase alternating electricity in accordance with a control instruction from the controller 7, and then controls rotation torque of the traction motor 5.

The traction motor 5 generates rotation torque serving as power of the fuel cell vehicle, and is also configured to generate regenerative electricity during deceleration. The rotation torque of the traction motor 5 is transmitted to tires 9 through a shaft 8a after decelerated to a predetermined revolving speed by a speed reducer 8. In the present embodiment, all the devices (including the traction motor 5 and the speed reducer 8) which operate in response to electricity supplied from the fuel cell 2 are referred to as load devices.

The controller 7 is a computer system which performs integrated control of the fuel cell system 1, and has, for example, a CPU, a RAM, and a ROM. The controller 7 calculates a load (required electricity) of the load device in response to the input of signals (e.g. a signal indicating an accelerator position, a signal indicating a vehicle speed, and signals indicating an output current and an output voltage of the fuel cell 2) supplied from various sensors.

The load of the load device is, for example, a sum value of vehicle running electricity and auxiliary electricity. The auxiliary electricity includes electricity consumed in in-vehicle auxiliaries (e.g. an air compressor, a hydrogen pump, and cooling water circulating pump), electricity consumed in devices (a transmission, a wheel controller, a steering device, a suspension device) necessary for vehicle running, and electricity consumed in devices (e.g. an air conditioner, lighting equipment, audio equipment) disposed in a passenger space.

The controller 7 determines the allocation of output electricity of the fuel cell 2 and the battery 3, and calculates an electricity generation instruction value. Having calculated the required electricity for the fuel cell 2 and the battery 3, the controller 7 controls the operations of the FC converter 10 and the battery converter 6 so that the required electricity can be obtained.

The controller 7 selects a driving phase of the FC converter 10 in accordance with the load of the load device. For example, when the load of the load device is equal to or less than a predetermined threshold, the controller 7 selects one (e.g. the U-phase converter 11) of the four driving phases of the FC converter 10. When the load of the load device is more than the predetermined threshold, the controller 7 selects a plurality of driving phases (e.g. two phases; the U-phase converter 11 and the W-phase converter 13). That is, the controller 7 functions as selecting means in the present invention.

When the controller 7 has selected a plurality of driving phases in accordance with the load of the load device, the controller 7 drives the driving phases at carrier frequencies so that these driving phases are nearly opposite to each other. That is, the controller 7 also functions as driving means in the present invention.

Figure 2:
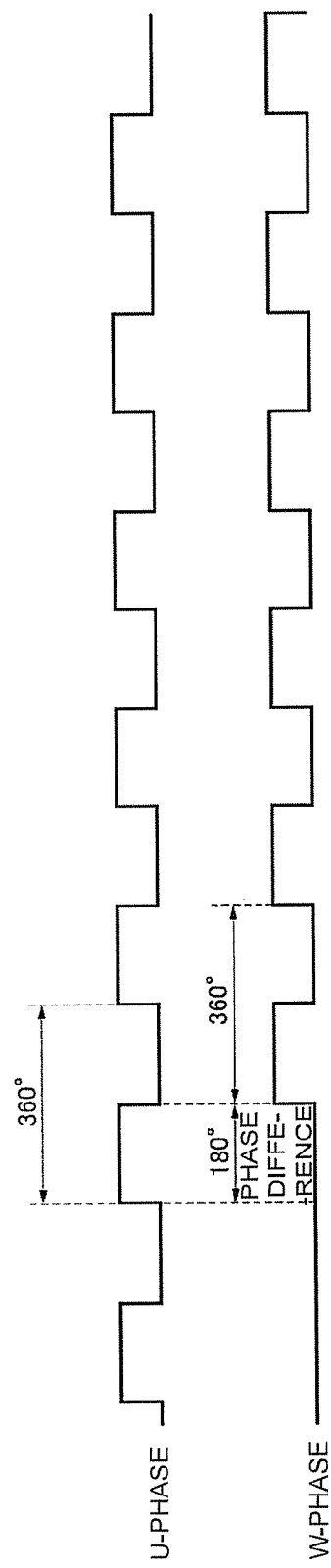
FIG. 2 is a time chart of control signals when two phases (U-phase and W-phase) of an FC converter of the fuel cell system shown in FIG. 1 are driven.
Figure 3:
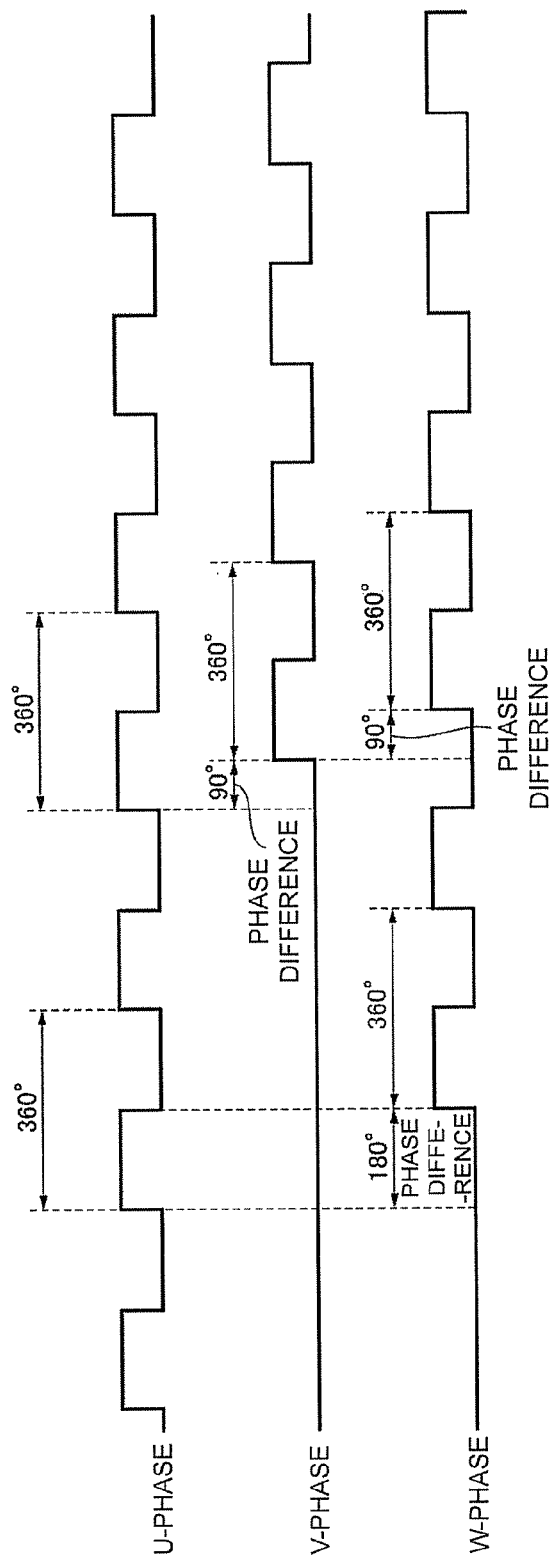
FIG. 3 is a time chart of control signals when three phases (U-phase, V-phase, and W-phase) of the FC converter of the fuel cell system shown in FIG. 1 are driven.
Figure 4:
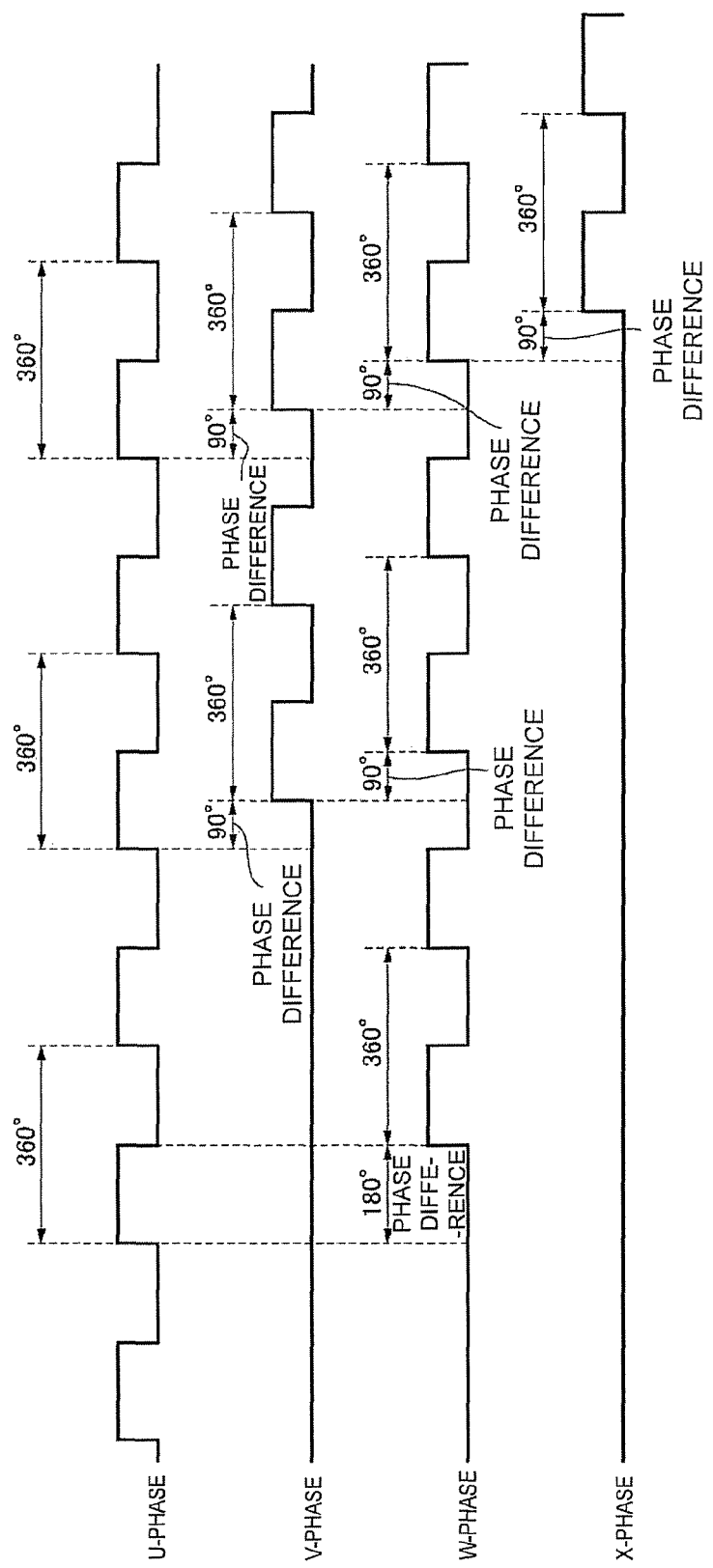
FIG. 4 is a time chart of control signals when four phases (U-phase, V-phase, W-phase, and X-phase) of the FC converter of the fuel cell system shown in FIG. 1 are driven.

For example, as shown in FIG. 2, when the controller 7 has selected two phases, i.e., the U-phase converter 11 and the W-phase converter 13, the controller 7 drives the two driving phases at the carrier frequencies so that U-phase and W-phase control signals have a phase difference of 180°. When the controller 7 has selected three phases, i.e., the U-phase converter 11, the V-phase converter 12, and the W-phase converter 13, the controller 7 drives the two driving phases so that U-phase and V-phase control signals have a phase difference of 90°, and also drives the two driving phases so that U-phase and w-phase control signals have a phase difference of 180°, as shown in FIG. 3. In this case, the V-phase and W-phase control signals have a phase difference of 90°. When the controller 7 has selected four phases, i.e., the U-phase converter 11, the V-phase converter 12, the W-phase converter 13, and the X-phase converter 14, the controller 7 drives the four driving phases at the carrier frequencies so that U-phase, V-phase, W-phase, and X-phase control signals have a phase difference of 90°, as shown in FIG. 4.

The controller 7 thus drives and controls a plurality of driving phases of the FC converter 10, and thereby interleaves the output current so that noise of the reactor can be reduced.

Figure 5:
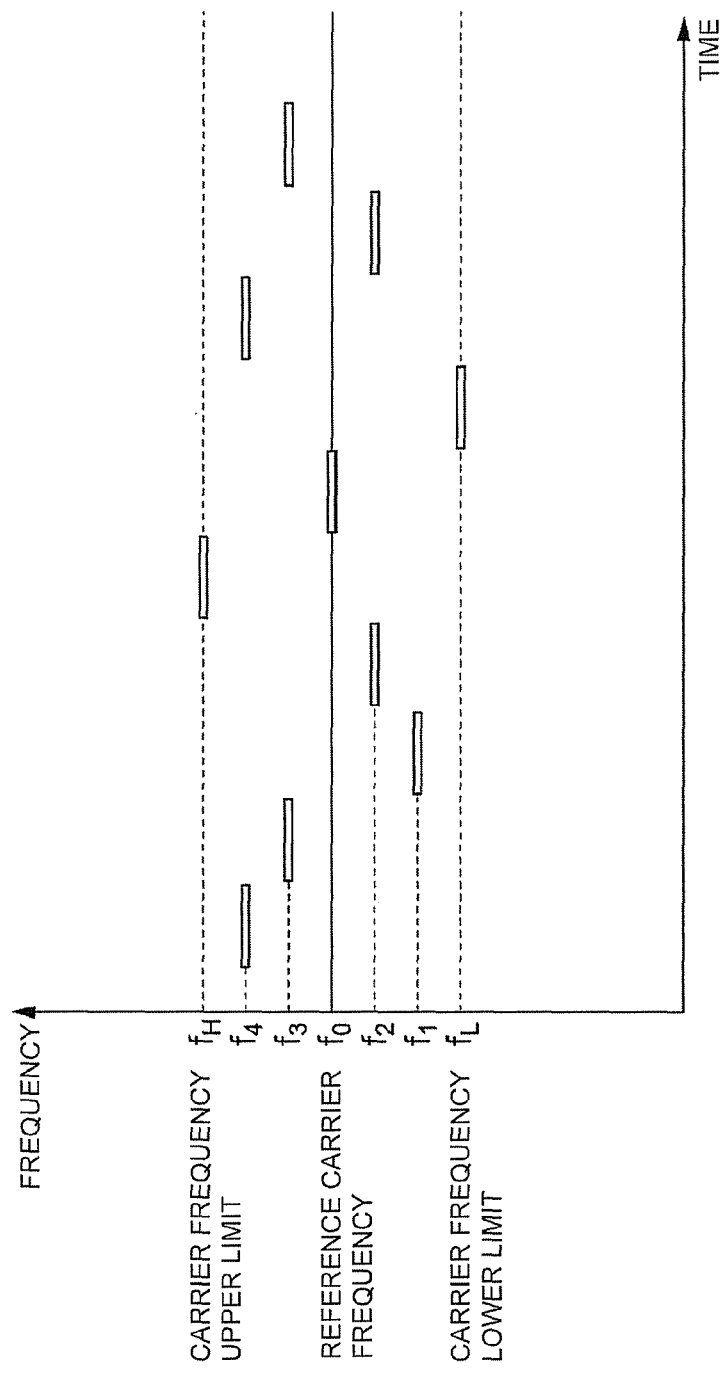
FIG. 5 is a graph showing the diffusion of carrier frequencies of the driving phases of the FC converter of the fuel cell system shown in FIG. 1.

Furthermore, when driving the driving phases (U-phase, V-phase, W-phase, and X-phase) of the FC converter 10, the controller 7 switches the carrier frequencies of the driving phases within a predetermined band. More specifically, as shown in FIG. 5, the controller 7 randomly selects a plurality of carrier frequencies ($f_1$ to $f_4$) within a predetermined band (a band ranging from a carrier frequency lower limit $f_L$ to a carrier frequency upper limit $f_H$) around a reference carrier frequency $f_0$ of the driving phases, and switches to the selected carrier frequencies. In the present embodiment, the distribution of the selected carrier frequencies is a normal distribution.

Figure 6:
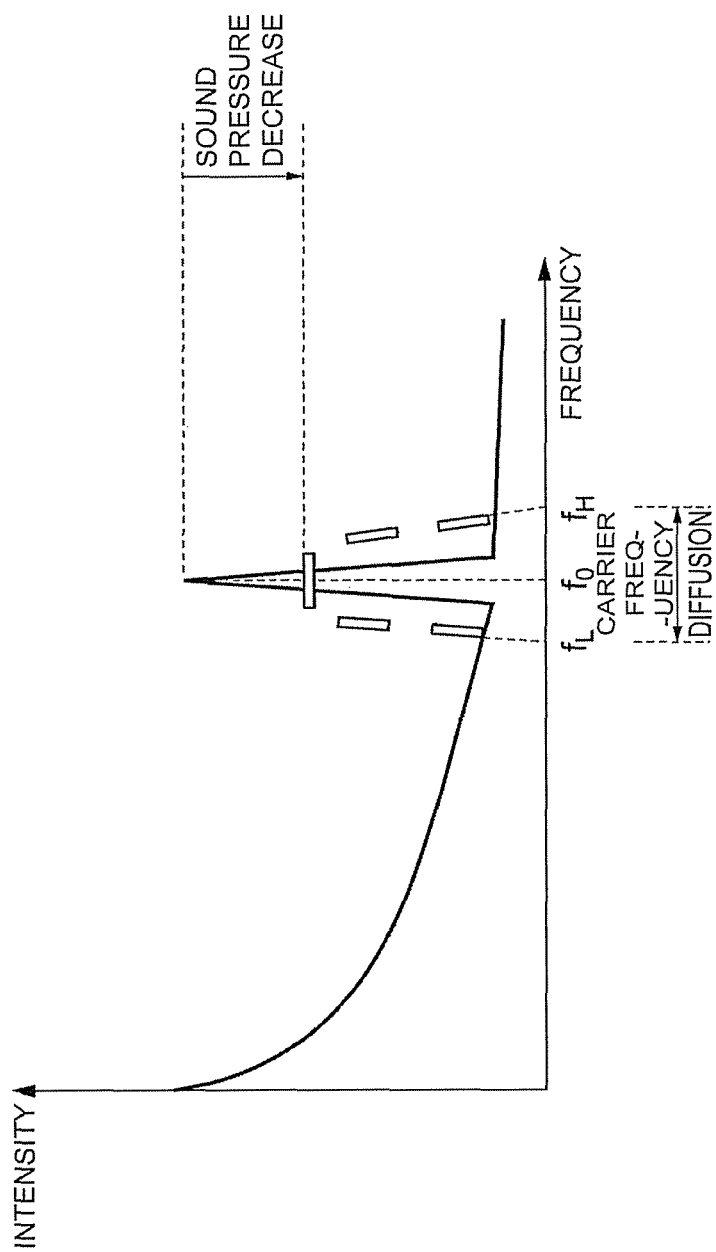
FIG. 6 is a graph showing a frequency spectrum when the carrier frequencies are diffused.

The controller 7 can modify (reduce the intensity of) a frequency spectrum as shown in FIG. 6 by diffusing the carrier frequencies of the driving phases of the FC converter 10 so that sound pressure of the reactor in each driving phase can be audibly reduced.

In the fuel cell system 1 according to the embodiment described above, when a plurality of driving phases of the FC converter 10 are selected, it is possible to drive the driving phases so that these driving phases are opposite to each other. Therefore, the output current can be interleaved, so that noise of the reactor can be reduced.

In the fuel cell system 1 according to the embodiment described above, when a plurality of driving phases of the FC converter 10 are driven, it is possible to switch the carrier frequencies of the driving phases within a predetermined band. Therefore, the sound pressure of the reactor of each phase can be reduced, and noise can be further reduced.

Although the carrier frequencies are diffused to reduce noise in the example shown in the embodiment described above, various correction controls below can also be performed in accordance with the diffusion of the carrier frequencies.

<Gain Correction>

Suppose that the controller 7 of the fuel cell system 1 performs calculation processing to calculate a control duty of the switching element of each driving phase of the FC converter 10, and performs feedback control (PI feedback control having a proportional gain and an integral gain) of the FC converter 10 synchronously with the carrier frequency. If the carrier frequencies are switched during this PI feedback control, the effect of the integral gain in the PI feedback control changes. That is, a phenomenon in which the integral gain apparently changes with the switching of the carrier frequencies.

Accordingly, the controller 7 can correct the apparent change of the integral gain associated with the switching of the carrier frequencies, in accordance with the reference carrier frequency and the present (switched) carrier frequency. In this case, the controller 7 functions as gain correcting means.

For example, in normal PI feedback control, a feedback (FB) correction term is calculated by Equation (4) below.

$$\text{FB correction term} = K_P \times e + K_I \times \int (e) dt \quad (4)$$

wherein $K_P$ and $K_I$ are a proportional gain and an integral gain, respectively, and e is a deviation.

When the carrier frequencies are switched, the controller 7 multiplies the ratio of a present control period (a reciprocal number of the present carrier frequency) to a reference control period (a reciprocal number of the reference carrier frequency) by the normal integral gain $K_I$ to calculate a corrected integral gain, and can thereby calculate the FB correction term by using Equation (5) below.

$$\text{FB correction term} = K_P \times e + K_I \times (T_C/T_0) \times \int(e)dt \quad (5)$$

wherein $T_C$ is the present control period, and $T_0$ is the reference control period.

<Sin Wave Superposition Correction>

Suppose that the controller 7 of the fuel cell system 1 performs high-speed sampling by superposing a sin wave signal on an input current and an input voltage to the FC converter 10 to measure the impedance of an input electric supply to the FC converter 10. If the carrier frequencies are switched during the high-speed sampling performed by the sin wave superposition, the update timing of the control duty changes with the switching of the carrier frequencies. Therefore, distortion is caused if the sin wave signal is calculated and superposed on the assumption that the control duty is updated at regular intervals.

Accordingly, the controller 7 superposes a sin wave signal corresponding to the present (switched) carrier frequency (a sin wave signal calculated on the basis of the present control period) to correct the sampled current and voltage values, and can thus inhibit the occurrence of distortion. In this case, the controller 7 functions as sin wave superposing correcting means.

<Current Sampling Correction>

Suppose that the controller 7 of the fuel cell system 1 samples the reactor current of the FC converter 10. If the carrier frequencies are switched during this sampling of the reactor current, an average value of converter currents cannot be accurately AD-converted, and an offset error may be generated in a sampling value of the reactor current.

Accordingly, the controller 7 inserts an adjustment carrier frequency between the carrier frequency before switched and the carrier frequency after switched, and can thereby inhibit the offset error of the reactor current caused by the switching of the carrier frequencies. In this case, the controller 7 functions as current sampling correcting means.

<Temperature Correction>

Suppose that the controller 7 of the fuel cell system 1 uses the carrier frequency to estimate the temperature of the switching element of each driving phase of the FC converter 10. In this case, the controller 7 derives a correction coefficient corresponding to the carrier frequency after switched by using a map which defines the relationship between the carrier frequency and a correction coefficient, and can use the derived correction coefficient to correct the estimated element temperature. In this case, the controller 7 functions as temperature correcting means.

Although the fuel cell system according to the present invention is installed in the fuel cell vehicle in the example shown in the embodiment described above, the fuel cell system according to the present invention can be installed in various movable bodies (e.g. a robot, a ship, an aircraft) other than the fuel cell vehicle. The fuel cell system according to the present invention may also be applied to a stationary electricity generation system used as electricity generation equipment for an architecture (e.g. a house, or a building). Moreover, the fuel cell system according to the present invention is also applicable to a portable fuel cell system.

REFERENCE SIGNS LIST

1: fuel cell system, 2: fuel cell, 5: traction motor (load device), 7: controller (selecting means, driving means, gain correcting means, sin wave superposing correcting means, current sampling correcting means, temperature correcting means), 10: FC converter (multiple-phase converter), 11: U-phase converter, 12: V-phase converter, 13: W-phase converter, 14: X-phase converter, $f_0$: reference carrier frequency, $f_1$ to $f_4$: a plurality of carrier frequencies, $f_L$: carrier frequency lower limit, $F_H$: carrier frequency upper limit.

The invention claimed is:

1. A fuel cell system which comprises a multiple-phase converter provided between a fuel cell and a load device, the fuel cell system comprising:
   selecting means for selecting a driving phase of the multiple-phase converter in accordance with a load of the load device; and
   driving means for driving, when the selecting means selects a plurality of driving phases, the plurality of driving phases at carrier frequencies so that the driving phases are nearly opposite to each other,
   wherein, when the selecting means selects three driving phases, the driving means drives, among the three driving phases, a first phase and a second phase with a phase difference of 90°, the second phase and a third phase with a phase difference of 90°, and the third phase and the first phase with a phase difference of 180°.

2. The fuel cell system according to claim 1, wherein, when the selecting means selects four driving phases, the driving means drives the four driving phases with a phase difference of 90°.

3. The fuel cell system according to claim 1, wherein, when the selecting means selects two driving phases, the driving means drives the two driving phases with a phase difference of 180°.

4. The fuel cell system according to claim 1, wherein the driving means switches the carrier frequencies of the driving phases within a predetermined band.

5. The fuel cell system according to claim 4, wherein the driving means randomly selects a plurality of carrier frequencies within a predetermined band around a reference carrier frequency of the driving phases, and switches to the selected carrier frequencies.

6. The fuel cell system according to claim 5, wherein the driving means uses a normal distribution as a distribution of the selected carrier frequencies.

7. A fuel cell system which comprises a multiple-phase converter provided between a fuel cell and a load device, the fuel cell system comprising:
   selecting means for selecting a driving phase of the multiple-phase converter in accordance with a load of the load device; and
   driving means for driving, when the selecting means selects a plurality of driving phases, the plurality of driving phases at carrier frequencies so that the driving phases are nearly opposite to each other, the driving means switching the carrier frequencies of the driving phases within a predetermined band, and
   gain correction means for correcting a feedback gain in response to the switching of the carrier frequencies by the driving means when the multiple-phase converter is feedback-controlled synchronously with the carrier frequency.

8. The fuel cell system according to claim 7, wherein:
   the feedback control is PI feedback control having a proportional gain and an integral gain; and
   the gain correction means corrects the integral gain in accordance with the reference carrier frequency and the carrier frequency after switched.

9. A fuel cell system which comprises a multiple-phase converter provided between a fuel cell and a load device, the fuel cell system comprising:

selecting means for selecting a driving phase of the multiple-phase converter in accordance with a load of the load device; and driving means for driving, when the selecting means selects a plurality of driving phases, the plurality of driving phases at carrier frequencies so that the driving phases are nearly opposite to each other, the driving means switching the carrier frequencies of the driving phases within a predetermined band, and sin wave superposing correcting means for correcting, when sampling is performed by superposing a sin wave signal on an input current and an input voltage to measure the impedance of an input electric supply to the multiple-phase converter, sampled current and voltage values by superposing the sin wave signal corresponding to the carrier frequency after switched by the driving means.

10. The fuel cell system according to claim 4, further comprising:

current sampling correcting means for correcting, when a reactor current of the multiple-phase converter is sampled, the timing of sampling in response to the switching of the carrier frequencies by the driving means.

11. The fuel cell system according to claim 4, further comprising:

temperature correcting means for correcting, when the carrier frequency is used to estimate an element temperature of the multiple-phase converter, the element temperature estimated in response to the switching of the carrier frequencies by the driving means.

* * * * *